United States Patent [19]

Stouffer

[11] Patent Number: 5,049,867
[45] Date of Patent: Sep. 17, 1991

[54] VEHICLE SECURITY APPARATUS

[75] Inventor: Peter J. Stouffer, Auburn, Mich.

[73] Assignee: Code-Alarm, Inc., Madison Heights, Mich.

[21] Appl. No.: 278,251

[22] Filed: Nov. 30, 1988

[51] Int. Cl.⁵ .................. B60R 25/10; G08B 26/00
[52] U.S. Cl. .................. 340/426; 340/531; 340/539; 340/506; 307/10.2; 307/10.4
[58] Field of Search .................. 340/425.5, 426, 429, 340/430, 825.34, 825.44, 539, 531; 307/9.1, 10.1, 10.2, 10.4, 10.5

[56] References Cited

U.S. PATENT DOCUMENTS

| | | |
|---|---|---|
| 3,614,734 | 10/1971 | Davis . |
| 3,703,714 | 11/1972 | Andrews . |
| 3,833,895 | 9/1974 | Fecteau . |
| 3,845,361 | 10/1974 | Watase et al. . |
| 3,858,175 | 12/1974 | Kopera, Jr. . |
| 3,930,226 | 12/1975 | Plumberg . |
| 3,956,732 | 5/1976 | Teich . |
| 3,987,408 | 10/1976 | Sassover et al. . |
| 4,067,411 | 1/1978 | Conley et al. . |
| 4,101,873 | 7/1978 | Anderson et al. . |
| 4,104,694 | 8/1978 | Hargrove . |
| 4,141,010 | 2/1979 | Umpleby et al. . |
| 4,143,368 | 3/1979 | Route et al. . |
| 4,159,467 | 6/1979 | Ballin . |
| 4,258,352 | 3/1981 | Lipschutz . |
| 4,327,444 | 4/1982 | Court . |
| 4,383,242 | 5/1983 | Sassover, et al. ............ 340/539 |
| 4,535,333 | 8/1985 | Twardowski ............ 340/539 |
| 4,631,527 | 12/1986 | DeWitt et al. ............ 340/539 |
| 4,737,770 | 4/1988 | Brunius et al. ............ 340/539 |
| 4,754,255 | 6/1988 | Sanders et al. ............ 340/539 |
| 4,772,876 | 9/1988 | Laud ............ 340/539 |
| 4,821,027 | 4/1989 | Mallory et al. ............ 340/539 |
| 4,855,713 | 8/1989 | Brunius ............ 340/506 |

OTHER PUBLICATIONS

Clifford Ultracode Remote Control System-Brochure Clifford Electronics, Inc., 6-18-87, Clifford Intell: Guard 500—Brochure; 6-18-89.

Primary Examiner—Donnie L. Crosland
Attorney, Agent, or Firm—Basile and Hanlon

[57] ABSTRACT

A vehicle security apparatus includes a portable transmitter generating at least one discrete coded signal. A receiver mounted in the vehicle in response to the first receipt and recognition of a discrete coded signal from the transmitter arms an anti-theft system in the vehicle security apparatus. The anti-theft system includes a starter interrupt which prevents the starting of the vehicle when the anti-theft system is armed and/or alarms, both visual and/or audible, to indicate an attempted access to the vehicle. The receiver is capable of learning one or more codes associated with specific transmitters. A sensor is mounted on the vehicle to detect attempted access to the vehicle. The receiver, when armed and receiving an output from the sensor, activates the starter interrupt and/or the alarm for a predetermined time. The receiver is optionally capable of automatically operating the vehicle door locks, the vehicle hood latch and trunk latches, as well as the inside vehicle lights automatically during the arming and disarming sequences.

16 Claims, 10 Drawing Sheets

VEHICLE SECURITY APPARATUS

BACKGROUND OF THE INVENTION

Field of the Invention

This invention relates, in general, to vehicle anti-theft devices.

Vehicle security apparatus are commonly employed to indicate the unauthorized access to and/or prevent the operation of vehicles when unauthorized access to a vehicle housing a vehicle security apparatus is attempted. Such apparatus employ sensors which are mounted on the vehicle to detect access to the vehicle, such as the opening of a door, trunk, hood, window, or movement of the vehicle caused by jacking the vehicle, breaking a window, etc. Such security apparatus activate an alarm when such an intrusion is attempted, such as by beeping the vehicle's horn, energizing a siren mounted on the vehicle and/or flashing the vehicles lights.

The known vehicle security apparatus are activated or armed by a variety of means. External key locks may be employed to energize the security apparatus after the operator has left the vehicle. Such apparatus have also been activated by the closing and locking of a vehicle's doors or via a remote, hand-held transmitter carried by the vehicle operator which is activated externally from the vehicle to arm and disarm the security system.

In the latter type of vehicle security apparatus, the hand-held transmitter emits a coded signal which is detected by a receiver mounted within the vehicle. The receiver recognizes the coded signal and compares it to a stored code to recognize a specific transmitter and, thereupon, to arm or activate the security apparatus upon receipt of the specific coded signal. A second signal from the transmitter is employed to disarm or deactivate the security apparatus.

When the system is armed, any attempt to gain access to the vehicle and/or to move or operate the vehicle causes the receiver to activate an alarm and/or disconnect the starter system to prevent operation of the vehicle. It is also known to employ various additional features in such security apparatus which automatically lock and unlock the vehicles doors coincident with arming and disarming of the security apparatus, latch and unlatch the vehicle's trunk and/or hood latches and/or operate various electrical elements, such as the interior lights of the vehicle.

The known vehicle security apparatus utilize a limited number of discrete codes which are matched between a specific transmitter and a specific receiver. These codes are selected and installed by the manufacturer of the vehicle security apparatus and are not easily altered. Thus, the loss of a transmitter requires that a new transmitter be coded with the predetermined code of a specific receiver mounted in a vehicle. Due to the large number of binary bits required to provide the necessary thousands or millions of discrete codes, the task of programming a transmitter code to match a specific receiver becomes a time consuming and tedious task.

Furthermore, in two car families, separate transmitters are required for each vehicle having a security apparatus mounted therein. This proves cumbersome as a single operator may desire from time to time to arm or disarm the security apparatus of either vehicle.

Thus, it would be desirable to provide a vehicle security apparatus which utilizes one of a large number of discrete codes. It would also be desirable to provide a vehicle security apparatus in which the codes are easily programmed in the transmitter and receiver sections of the vehicle security apparatus. It would also be desirable to provide a vehicle security apparatus in which the receiver can learn or be programmed at any time with the code of a specific transmitter. It would also be desirable to provide a vehicle security apparatus which effectively prevents the operation of the vehicle and/or activates an alarm when the security apparatus is armed and access to the vehicle is attempted. Finally, it would be desirable to provide a vehicle security apparatus in which various electrical components of the vehicle are automatically controlled coincident with the arming and disarming of the security apparatus.

SUMMARY OF THE INVENTION

The present invention is a vehicle security apparatus which inhibits the operation of the vehicle, when armed, and/or generates an alarm whenever access to the vehicle is attempted while the security apparatus is armed.

The vehicle security apparatus includes a hand-held, portable transmitter which is activated by the depression of one push button and transmits a discrete coded signal. The coded signal is received by a receiver means mounted within a vehicle.

The receiver means includes means for receiving and recognizing a discrete coded signal. The receiver also includes means for arming an anti-theft means mounted in the vehicle in response to the first receipt of a first discrete coded signal from the transmitter and for disarming the anti-theft means upon the second receipt and recognition of the first discrete coded signal from the transmitter.

Sensor means mounted on the vehicle detects attempted access and/or movement of the vehicle, such as the opening of a door, breaking of a window, etc. The receiver means also includes means for learning a discrete code associated with a specific transmitter means. The learning means includes control means mounted within the receiver and memory means for storing one or more discrete coded signals learned by the receiver to recognize and arm or disarm the security apparatus. When in a "learn mode", the learning means receives a discrete coded signal identifying a specific transmitter and stores it for subsequent recognition.

In one embodiment, a first discrete code is hardwired in a transmitter and provides one code out of up to 65,536 separate codes which is specific to that transmitter. In another embodiment, the transmitter means includes a control means and a memory means for storing the discrete code. In the latter embodiment, the memory means allows either emulation of the first embodiment or a higher transmission of one out of approximately four billion possible codes. The receiver means is programmed so as to learn either push button on the transmitter and thereby either discrete code. Additionally, the receiver means may learn a second discrete code from another secondary transmitter. This allows the receiver means to recognize either code and arm and disarm the vehicle security apparatus when either coded signal is received.

In a preferred embodiment, the anti-theft means comprises means for interrputing the vehicle starter thereby preventing the operation of the vehicle when the anti-theft means is armed. The anti-theft means also includes alarm means which indicates an attempted access to the vehicle when the anti-theft means is armed. The alarm means may comprise an audible alarm, such as the vehicle's horn, or a separate siren mounted in the vehicle, or a visual alarm, such as the controlled flashing of the vehicle's exterior parking lights, or both. In a preferred embodiment of the present invention, the anti-theft means includes both a starter interrput and an alarm providing both visual and audible indications.

In another embodiment, the receiver means contains door lock control means, responsive to the arming and disarming of the anti-theft means and the position of the ignition switch, for controlling the automatic locking and unlocking of the vehicle doors. The doors are locked automatically when the vehicle security apparatus is armed and the ignition is off and are unlocked when the vehicle security apparatus is disarmed. Relays with switchable contacts connected to the door lock operator mechanism are driven by the receiver means to control the operation of the door locks. Similar means are also provided for selectively operating the vehicle hood latch, the vehicle interior dome light and, separately, the vehicle trunk latch.

In another embodiment, the control means of the receiver automatically arms the vehicle security apparatus a predetermined time after all the vehicle doors are closed without receiving a signal from the transmitter means. This provides added security in the event that the operator forgets to arm the security apparatus after leaving the vehicle.

The receiver means can also be provided with means for preventing any unauthorized attempt to disarm the security apparatus by scanning each consecutive received transmitter code. In this embodiment, the control means in the receiver detects the reception of four different transmitter codes within a predetermined time period, such as ten seconds, and activates the alarm to indicate an unauthorized attempt to disarm the security apparatus. Also, the control means includes scan deterrent means which times the scan rate of the receiver such that a separate transmitter code is recognized only once during each predetermined time period, such as one second. This hinders the scanning of all possible codes in order to detect the programmed code of a specfic receiver.

The vehicle security apparatus of the present invention provides an efficient vehicle security system which prevents the operation of the vehicle when armed and, upon an unauthorized attempt to access the vehicle, activates an alarm including either or both audible and visual alarms. The vehicle security apparatus is easily programmed with one of a large number of discrete codes thereby providing a unique code for each vehicle employing the security apparatus of the present invention. The receiver of the present vehicle security apparatus is capable of learning any code or codes associated with one or more transmitters. This simplifies the use of the vehicle security apparatus in the event that a transmitter is lost or malfunctions. A new transmitter with a different code may then be employed, with the receiver learning the new code and erasing the old code.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Throughout the following description and drawing, an identical reference number is used to refer to the same component shown in multiple figures of the drawing.

The present invention, in general, comprises a vehicle security apparatus which, when armed, prevents the starting of the engine of a vehicle and, in response to the detection of an unauthorized attempt to access the vehicle when armed activates an alarm. The vehicle security apparatus include a transmitter means, a receiver means, sensor means for detecting movement of or attempted access to the vehicle, an alarm means, such as a visual alarm controlling the flashing of the vehicle exterior parking lights or an audible alarm, such as the vehicle's horn or a separate siren mounted on the vehicle, and a starter interrupt means which interrupts and inhibits the operation of the vehicle starter.

Figure 1:
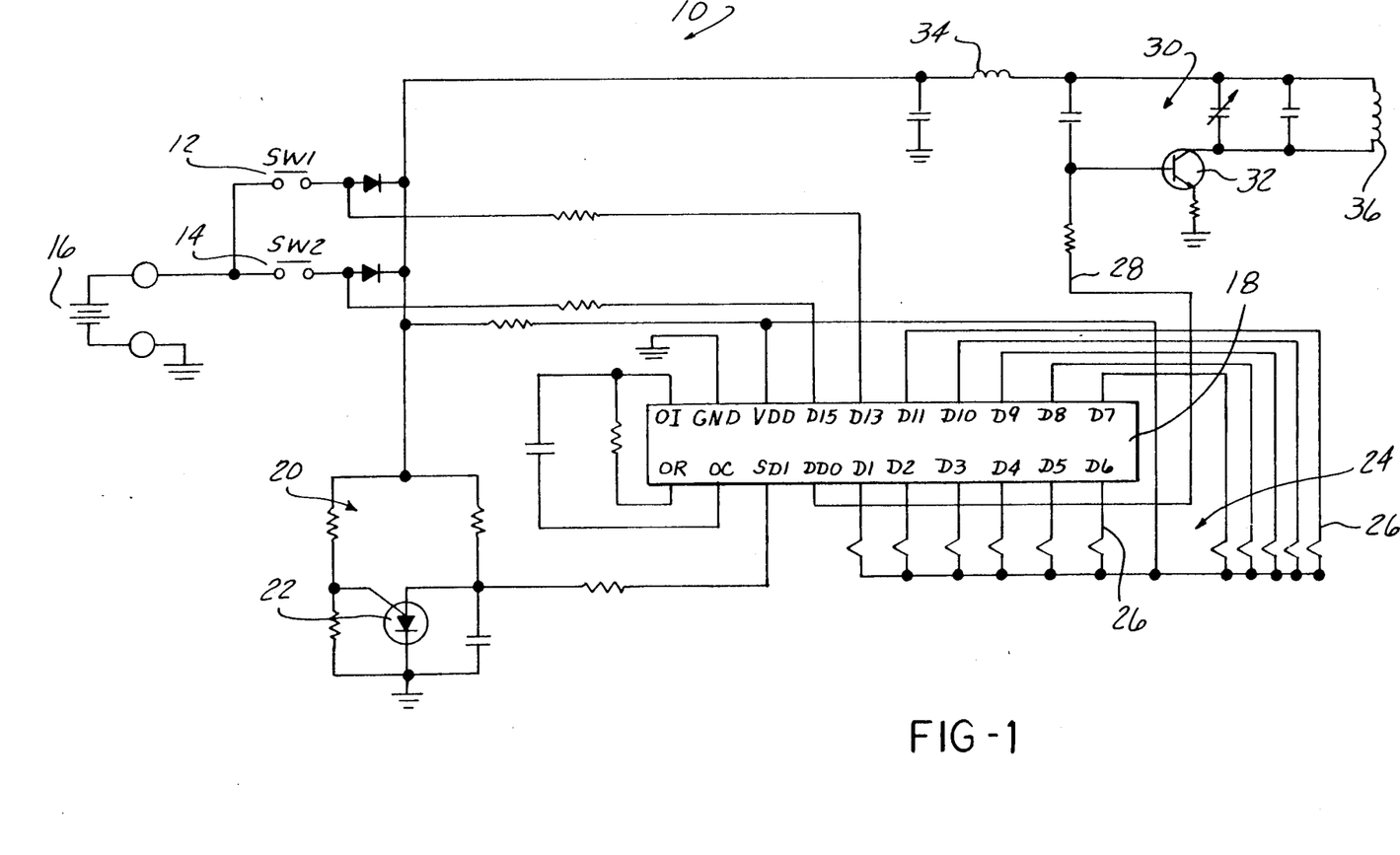
FIG. 1 is a schematic diagram of one embodiment of a transmitter employed in the vehicle security apparatus of the present invention.

In one embodiment shown in FIG. 1, the vehicle security apparatus includes a transmitter means denoted in general by reference number 10. The circuitry depicted in FIG. 1 is contained in a small, lightweight, hand-held housing, not shown, which is adapted to be easily carried by the operator of a vehicle, such as on a keyring. The housing includes first and second push buttons 12 and 14, respectively. Preferably, the first and second push buttons 12 and 14 are of the touch membrane type sealingly mounted in the housing beneath a thin, flexible membrane. A power source 16 is also mounted within the housing and provides electrical power to the operative components of the transmitter means 10. In a preferred embodiment, the power source 16 comprises a 12 volt battery, preferably an alkaline battery.

The first and second parallel push buttons 12 and 14 are each connected in series between the battery 16 and the operative elements of the transmitter means 10 so as to activate the transmitter 10 when one or both of the push buttons 12 and 14 are depressed.

The push buttons 12 and 14 are input to a decode circuit 18 manufactured by Supertex under model number ED-CA. The push buttons 12 and 14, when depressed, also activate a trigger circuit 20 containing a PUT 22 which generates a saw tooth timing signal to the decode circuit 18.

Also input to the decode circuit 18 is programmable code selection means denoted in general by reference number 24. The programmable code selection means 24 comprises, in this embodiment, a plurality of individual electrical conductors 26. In a preferred embodiment, the conductors 26 are in the form of electrical tracings etched on a PC board which may be cut or broken to provide a binary code input to the decoder 18. Eleven tracings 26 are provided by way of example to provide 2,048 possible discrete codes.

When activated, the decodes circuit 18 reads the programmable code from the code selection means 24 and, in conjunction with the state of the push buttons 12 and 14, generates a serial coded signal on line 28 which is input to a transmitter circuit denoted by reference number 30. The transmitter circuit 30 is a Colpitts oscillator operating at 314 Mhz. and includes an output transistor 32 and inductors 34 and 36.

In operation, when either or both of the push buttons 12 and 14 is pressed, the transmitter means 10 is activated and begins transmitting a code defined by the code selection means 24. The transmissions continue at a rate controlled by the trigger circuit 20 until both of the push buttons 12 and 14 are released.

Figures 2, 3, 4:
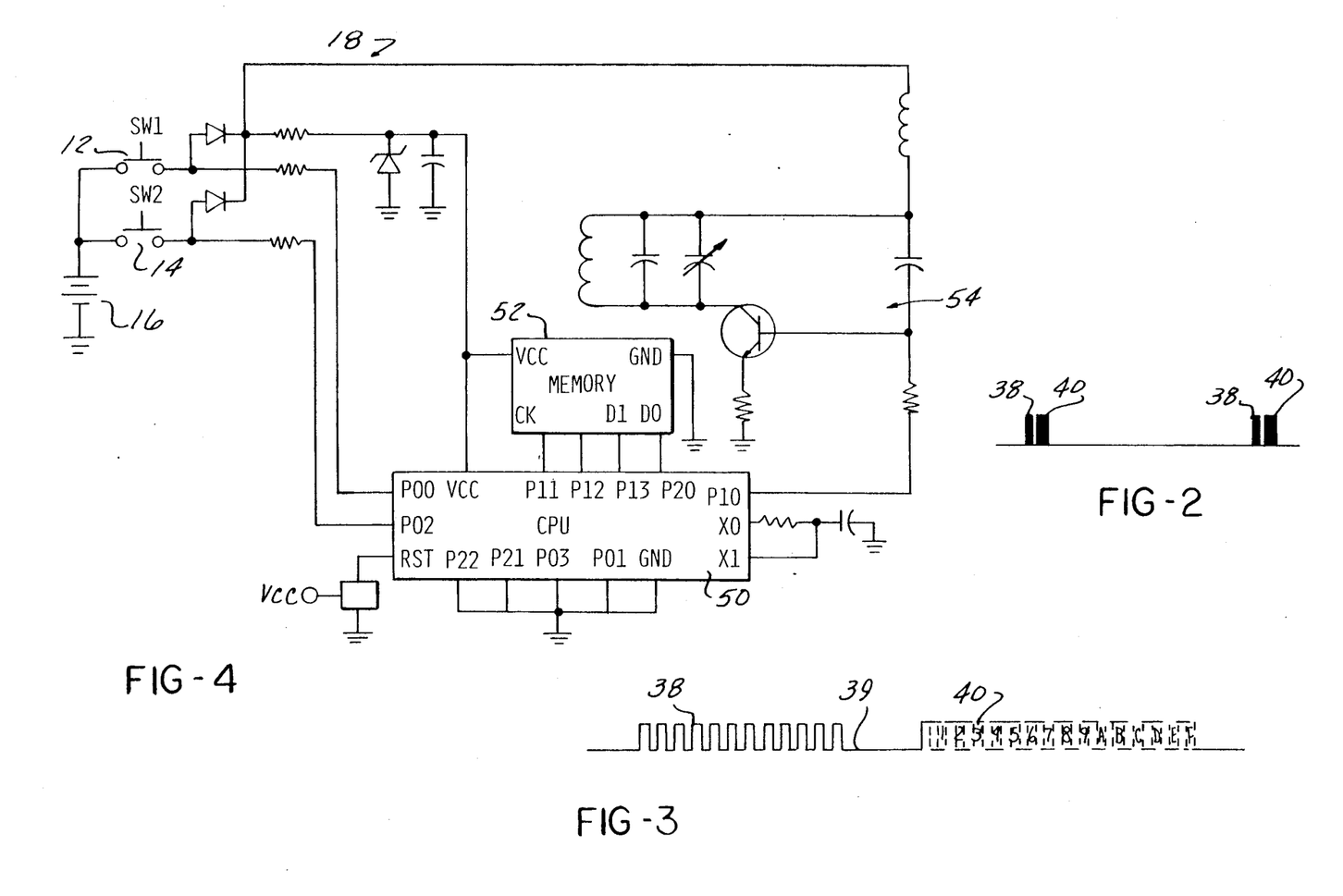
FIGS. 2 and 3 are waveforms illustrating the transmission of a discrete code from the transmitter of FIG. 1.
FIG. 4 is a schematic diagram of another embodiment of a transmitter employed in the vehicle security apparatus of the present invention.

As shown in FIGS. 2 and 3, the transmitted code is in the form of a fifteen bit word with eleven bits selected by the code selection conductors 26 and two bits representing the push buttons 12 and 14. Preferably, Manchester encoding is employed for the transmitter output. Synchronization of the receiver is accomplished by sending a preamble 38 consisting of twelve high or one bits, followed by a number of null bits 39, and then by the selected code 40 as shown in FIGS. 2 and 3. This sequence is repeated in response to the trigger circuit 20 once for each predetermined time interval, such as once each one hundred milliseconds until both of the push buttons 12 and 14 are released. The entire coded signal comprising the preamble 38, null bits 39 and coded bits 40 is sent for 12.6 milliseconds during each predetermined transmission cycle.

Another embodiment of a transmitter means 48 employed in the vehicle security apparatus of the present invention is depicted in FIG. 4. In FIG. 4, the first and second push buttons 12 and 14, respectively, are connected between the battery power source 16 and a central processing unit or controller 50. Preferably the controller is an integrated circuit sold by Toshiba as model number 42C40P. Associated with the controller 50 is a memory 52 which stores a programmable code and forms the code selection means of this embodiment of the present invention. The output from the controller 50 is to a conventional transmitter means 54 which operates in the same manner as that described above to transmit a discrete coded signal at 314 Mhz.

Preferably, the memory 52 is a EEPROM which enables any code to be erasably stored in the memory 52 and assigned to a specific transmitter 48. The output signal from the transmitter 48 has the same format as that shown in FIGS. 2 and 3. The code may be stored in the memory 52 as one sixteen bit word or, for higher security, as two or more sixteen bit words thereby increasing the number of discrete codes which may be selected.

The controller 50 executes an internally stored instruction control program to receive the outputs from the push buttons 12 and 14 and the stored coded signal from the memory 52 and generates the desired transmission signal when activated.

Figure 5:
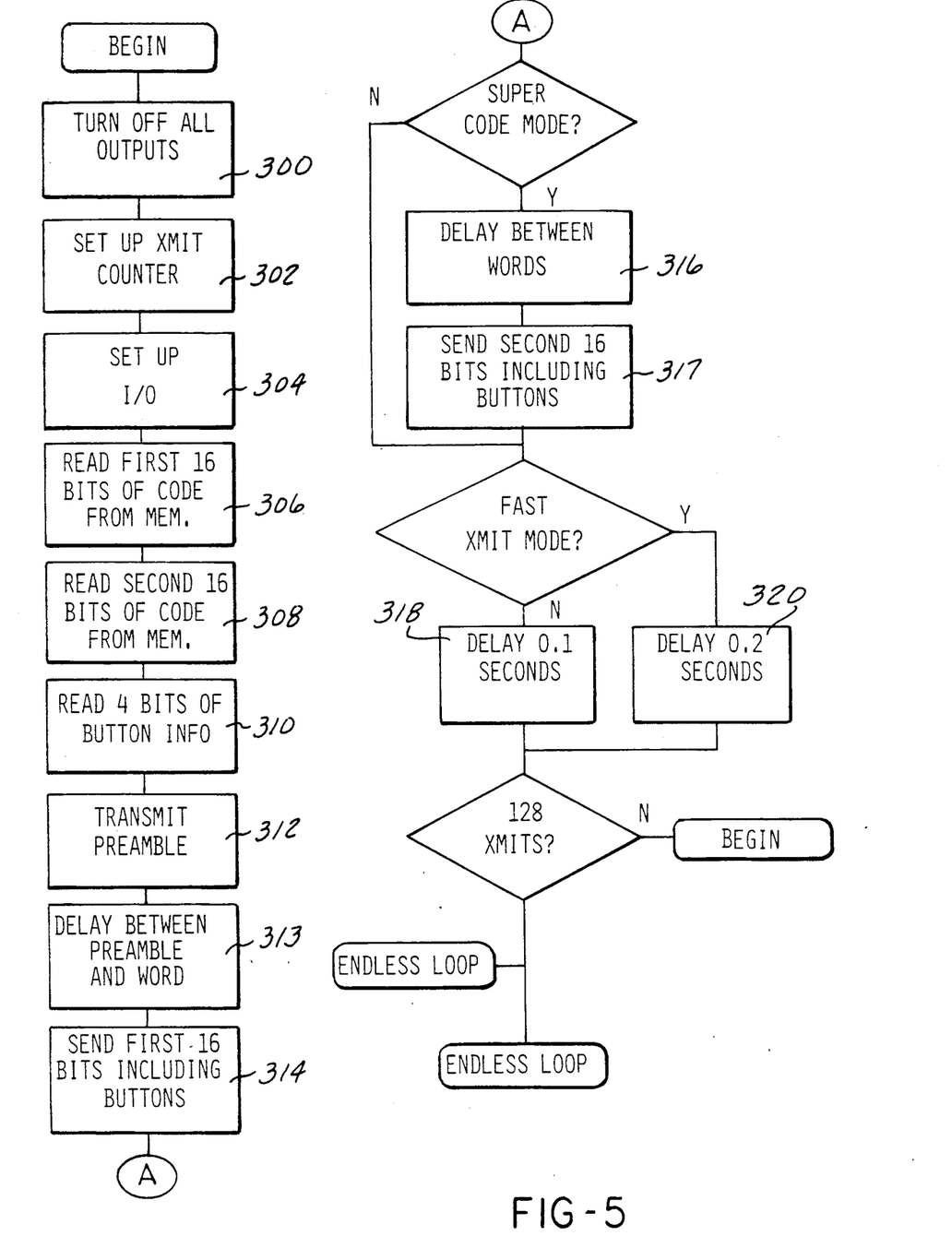
FIG. 5 is a flow chart illustrating the control program executed by the controller employed in the transmitter of FIG. 4.

FIG. 5 depicts a flow chart describing the sequence of operation of the controller 50 in executing the instruction control program. It should be noted that the transmitted signal from the controller 50 is in the form of a sixteen bit code. Alternately, any number of separate sixteen bit code words may be transmitted as part of the discrete coded signal to provide an unlimited number of distinct codes for use in the vehicle security apparatus of the present invention.

As depicted in FIG. 5, the controller 50 in executing the control program first, upon depression of one or both of the push buttons 12 and 14, turns off all outputs, step 300, and sets up a transmission counter 302 and the I/O 304. The first and second sixteen bits of code are read from memory 52 in steps 306 and 308. The four bits of push button code specifying the status of the push buttons 12 and 14 are read in step 310 and the preample 38, FIGS. 2 and 3, transmitted in step 312.

After a delay is generated, which represents the null bits 39, step 313, the first sixteen bits of code including the push button data are transmitted in step 314.

In a so-called "Super Code" mode in which millions of discrete codes are possible, a delay is initially generated after the first sixteen bits of code are transmitted, step 316, before the second sixteen bits of code are transmitted, step 317.

Next, a delay, step 318 or 320, is generated between transmissions before the control program loops to the start of beginning.

Figure 6A:
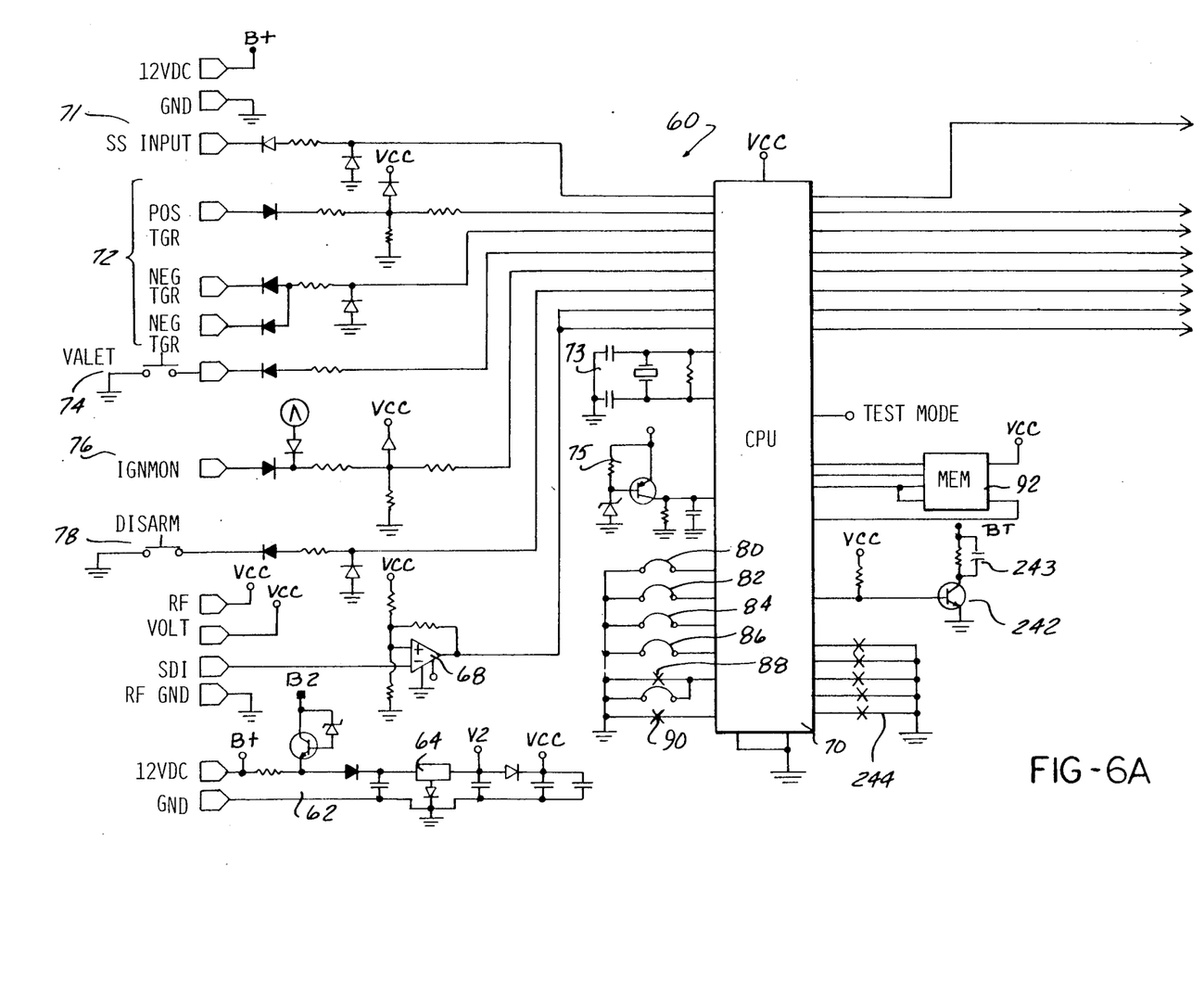
FIGS. 6A and 6B are schematic diagrams of the receiver means of the vehicle security apparatus of the present invention.
Figure 6B:
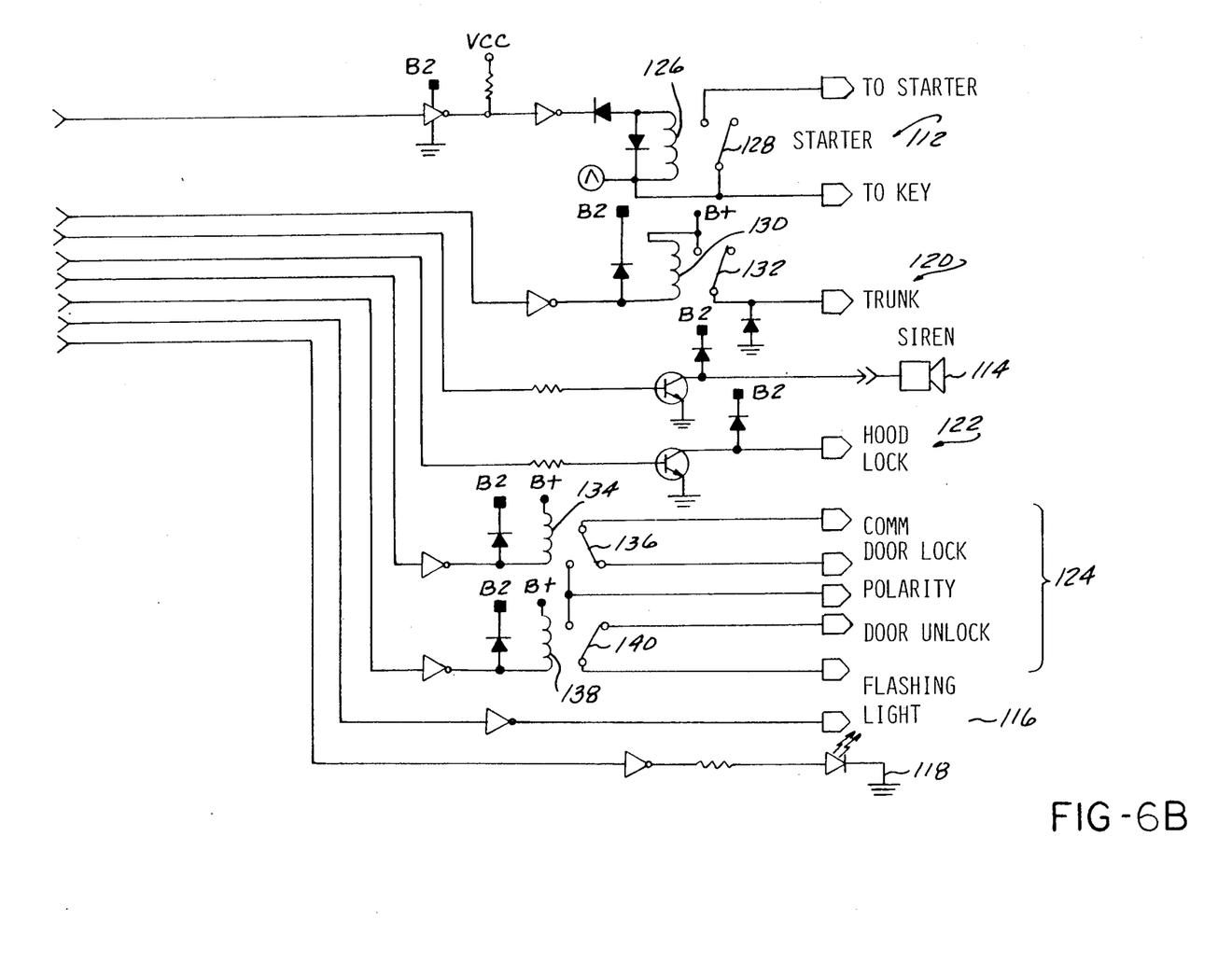

FIGS. 6A and 6B depict the receiver means 60 employed in the vehicle security apparatus of the present invention which receives a signal transmitted from the transmitter means 10 or 48. The receiver means 60 is contained in a housing, not shown, which is securely mounted at a convenient location within a vehicle, such as within the passenger compartment of the vehicle. The receiver means 60 includes a voltage regulation circuit 62 containing a voltage regulator 64 which provides various voltage level outputs labeled B+, B2, V2 and VCC used in the various operative elements of the receiver 60. It should be noted that the voltage regulator circuit 62 is connected to the vehicle battery so as to receive a twelve volt DC input as shown in FIG. 6A.

Figure 7:
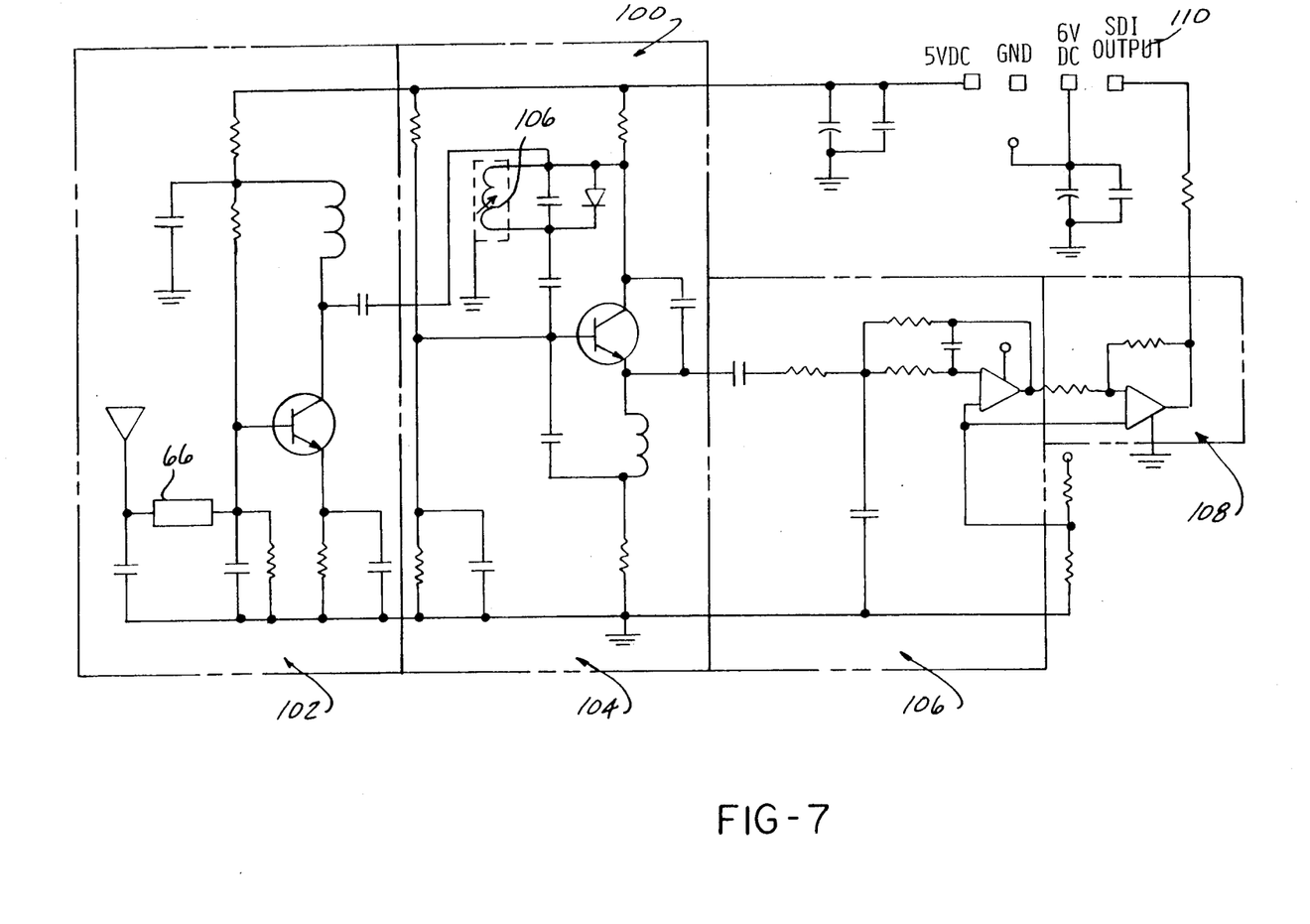
FIG. 7 is a schematic diagram of the receiver employed with the receiver means of FIGS. 6A and 6B.

A receiver circuit illustrated in FIG. 7 is a part of the receiver means 60 and is tuned to the frequency of the transmitted discrete coded signal from the transmitter means 10 or 48. Any conventional receiver circuit may be employed such as that illustrated in FIG. 7. As shown in FIG. 7, the receiver circuit 100 includes an antenna 66 of any conventional form which is mounted in the vehicle. Preferably, a quarter wave length antenna 66 is employed. The antenna 66 is connected in a preamplifier circuit 102. The preamplifier 102 is connected to an oscillator 104 including a tunable inductor 106 which is tuned to the frequency of the transmitter. In a preferred embodiment, the inductor 106 is tuned to a frequency of 314 Mhz to only receive signals transmitted from a transmitter 10 or 48 at this frequency. The received signals are output from the oscillator 104 through a low pass filter circuit 106 to a drive amplifier 108. The output of the amplifier 108 is an output signal 110 labeled SDI which is input to a central processing unit or microcontroller 70 shown in FIG. 6A.

While any central processing unit or controller 70 may be employed, in a preferred embodiment, the central processing unit or microcontroller is one sold by Mitsubishi under model number M50740.

A crystal circuit 73 is input to the microcontroller 70 to provide a system clock. Also input to the microcontroller 70 is a reset circuit 75 which provides undervoltage protection and resets the microprocessor 70 whenever a voltage of less than 4.5 volts occurs.

Other inputs to the microcontroller 70 include a sensor output 71, a door position sensor switch input 72, a valet switch 74, an ignition key switch "on" input 76 and a disarm push button 78. The use of these inputs 71, 72, 74, 76 and 78 will be described in greater detail hereafter.

Figures 10A, 10B:
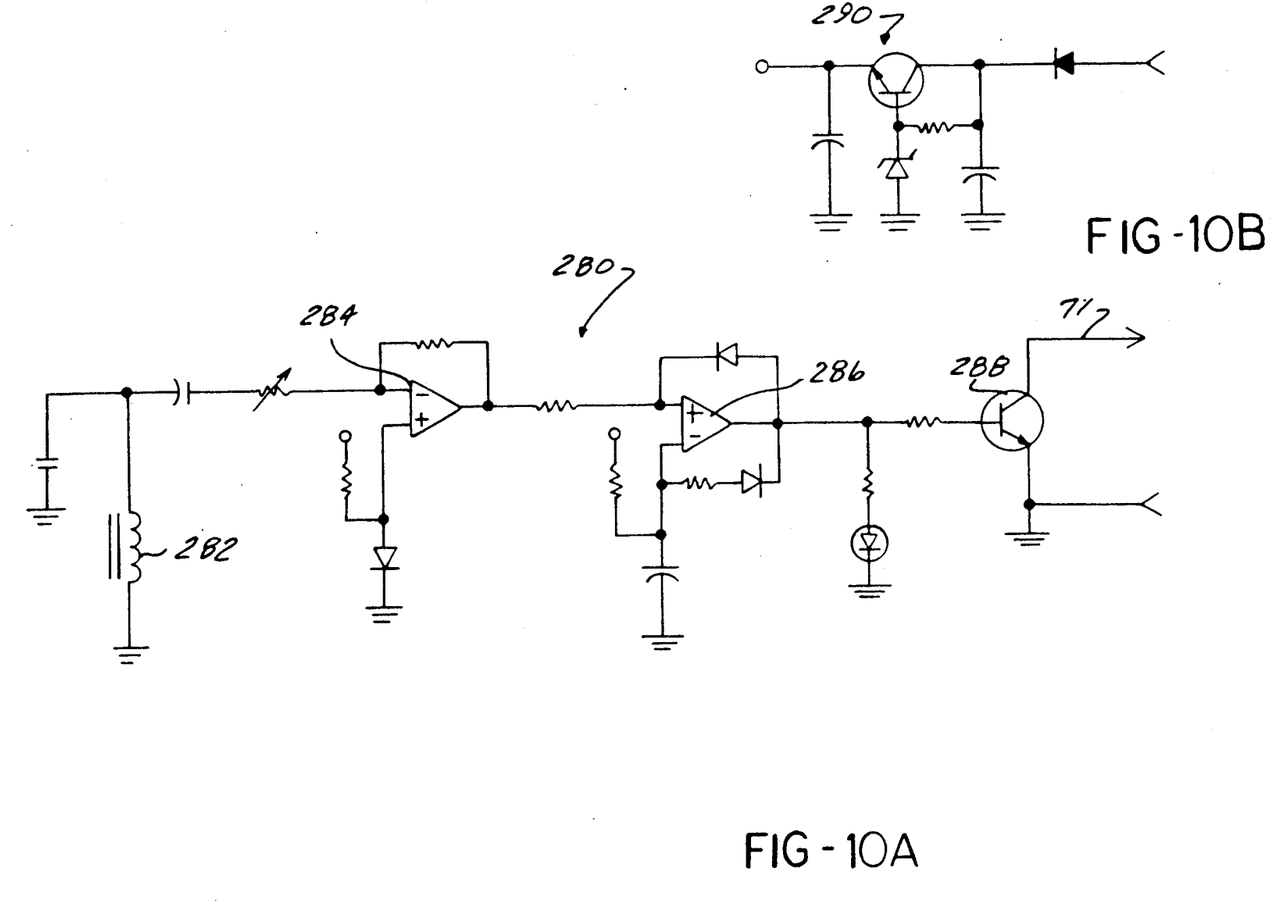
FIG. 10 is a schematic diagram of a typical shock sensor which may be employed in the vehicle security apparatus of this invention.

The sensor input 71 is a signal which indicates whenever access to the vehicle is attempted. This access can be detected in a number of ways, such as by noise generated by the breaking of a window or through movement of the vehicle. FIG. 10 depicts a typical shock sensor 280 which can be used in the present vehicle security apparatus.

Typically, the sensor 280 is mounted in the vehicle at any convenient location, such as under the dashboard in the passenger compartment. The sensor 280 includes a magnet, not shown, mounted on resilient pads on the vehicle so as to be movable with movement of the vehicle. A coil 282 is positioned adjacent the magnet and generates a current when the magnet moves. The current is amplified by amplifier 284 and input to a comparator 286. A voltage through a voltage divider is also input to the comparator 286 to set a threshold level.

When the level of signal generated in the coil 282 exceeds the threshold level, the comparator 286 conducts and activates transistor 288 to indicate movement of the vehicle. Also shown in FIG. 10 is a voltage regulator circuit 290 which provides proper voltage levels to the sensor 280.

It should also be noted that other sensors, such as a microphone input to an amplifier tuned to the audible frequency of breaking glass, can also be used in the vehicle security apparatus.

Also to the microcontroller 70 input are a series of inputs numbered 80, 82, 84, 86, 88 and 90. These inputs in the form of severible wires are provided to select various features or options for the vehicle security apparatus.

Loop 80 selects the passive arm feature of the present invention and, when severed, disables this feature. Loop 82 selects the automatic functions such as door lock and unlock and interior dome light. Loop 84 provides an extended door lock time of approximately four seconds when cut. When whole, a lock time of one-half second is provided. Loop 86 selects no "chirps" when cut. Loop 88 selects one car mode when whole and two car modes when severed. Finally, loop 90 provides a lower level security apparatus when cut in which certain features are disabled.

The microcontroller 70 executes an internal stored instruction control program to energize various outputs in response to the presence of certain of the inputs to the microcontroller 70. A non-volatile memory means 92 is connected to the microcontroller 70 and provides non-volatile memory storage of one or more programmable codes stored in the transmitter means associated with the receiver 60.

The controller 70 controls various outputs in the vehicle security apparatus 10 as shown in FIG. 6B. The outputs comprise a starter interrupt output 112, an audible alarm 114, such as a siren mounted in the vehicle or, optionally, the horn of the vehicle, a flashing light 116, such as the exterior parking lights of the vehicle in which the vehicle security apparatus of the present invention is mounted, and an LED 118 mounted on a convenient visible surface within the vehicle, such as the dashboard, and connected to the receiver means 60, the operation of which will be described in greater detail hereafter.

Other outputs from the controller 70 control various accessories in the vehicle, such as the trunk latch 120, a hood lock 122, an interior dome light operated simultaneously with the hood lock 122 and door lock and unlock means denoted in general by reference number 124.

In a preferred embodiment, a plurality of relays are mounted within the receiver means 60 for driving certain of the outputs. Relay 126 containing a switchable contact 128 is associated with the starter interrupt output 112, relay 130 with a switchable contact 132 is associated with the trunk latch output 120, relay 134 with a switchable contact 136 is associated with the door lock output and relay 138 with a switchable contact 140 is associated with the door unlock output. The remaining outputs utilize drive amplifiers to provide the necessary voltage levels for each output, such as the siren 114, the hood lock 122 and the vehicle flashing lights 116 as shown in FIG. 6B.

As noted above, the controller 70 executes a stored instruction control program to control the various outputs in response to various inputs. The controller 70 is configured for either a single car mode or a two car mode of operation. In the single car mode operation, the controller 70 via the stored instruction program arms and disarms the starter interrupt means 112 upon successive depressions of the first push button 12 on either transmitter 10 or 48. The second push button 14 on the transmitter 10 or 48, when depressed, activates the trunk release output 120. Simultaneous depression of the first and second push buttons 12 and 14 on either transmitter 10 or 48 places the controller 70 in a panic mode to activate the alarm means 114 and 116, as described hereafter.

In the two car mode of operation, the first push button 12 arms and disarms the starter interrupt 112. Holding the first push button 12 depressed for a predetermined amount of time, i.e., one second, after disarming the starter interrupt 112 will energize the trunk release output 120. The second push button 14 serves no control function in a first or primary vehicle with a vehicle security apparatus. However, the discrete code transmitted by the second push button 14 may be learned by a similar vehicle security apparatus in a second vehicle to control that vehicle's anti-theft system. Again, simultaneous depression of the first and second push buttons 12 and 14 places the controller 70 in a panic mode to activate the alarms 114 and 116.

In executing the control program, the controller 70 may be placed in a learn mode, an arm mode or a disarm mode. In each of these modes, the controller 70 controls the various outputs shown in FIG. 6B in response to the status of the various inputs.

Prepatory to describing the detailed operation of the control program, the detailed connections for the various inputs will be described. Due to the different voltage sensor systems employed on vehicles, the door position switches are provided with both positive and negative polarity connections to enable the vehicle security system of the present invention to be used with any vehicle. Depending upon which voltage polarity system is employed in the vehicle, a door switch which indicates whether the door is opened or closed is connected to either the positive or negative trigger inputs of the door position indicator input 72.

A valet switch 74 is mounted interiorally within the vehicle passenger compartment and is employed, when activated, to temporarily prevent the automatic arming of the vehicle security apparatus. The ignition switch input 76 is connected to the vehicle ignition switch and provides a signal when the ignition switch is in the "on" position. The disarm push button 78 is mounted interiorally within the vehicle in a hidden or not readily visible position. The disarm push button 78 is used in conjunction with the ignition switch input 76 to disarm the vehicle security apparatus from the interior of the vehicle as well in the event that the transmitter 10 or 48 is lost or misplaced. It is also employed in the "learn" mode as described hereafter.

Figure 8A:
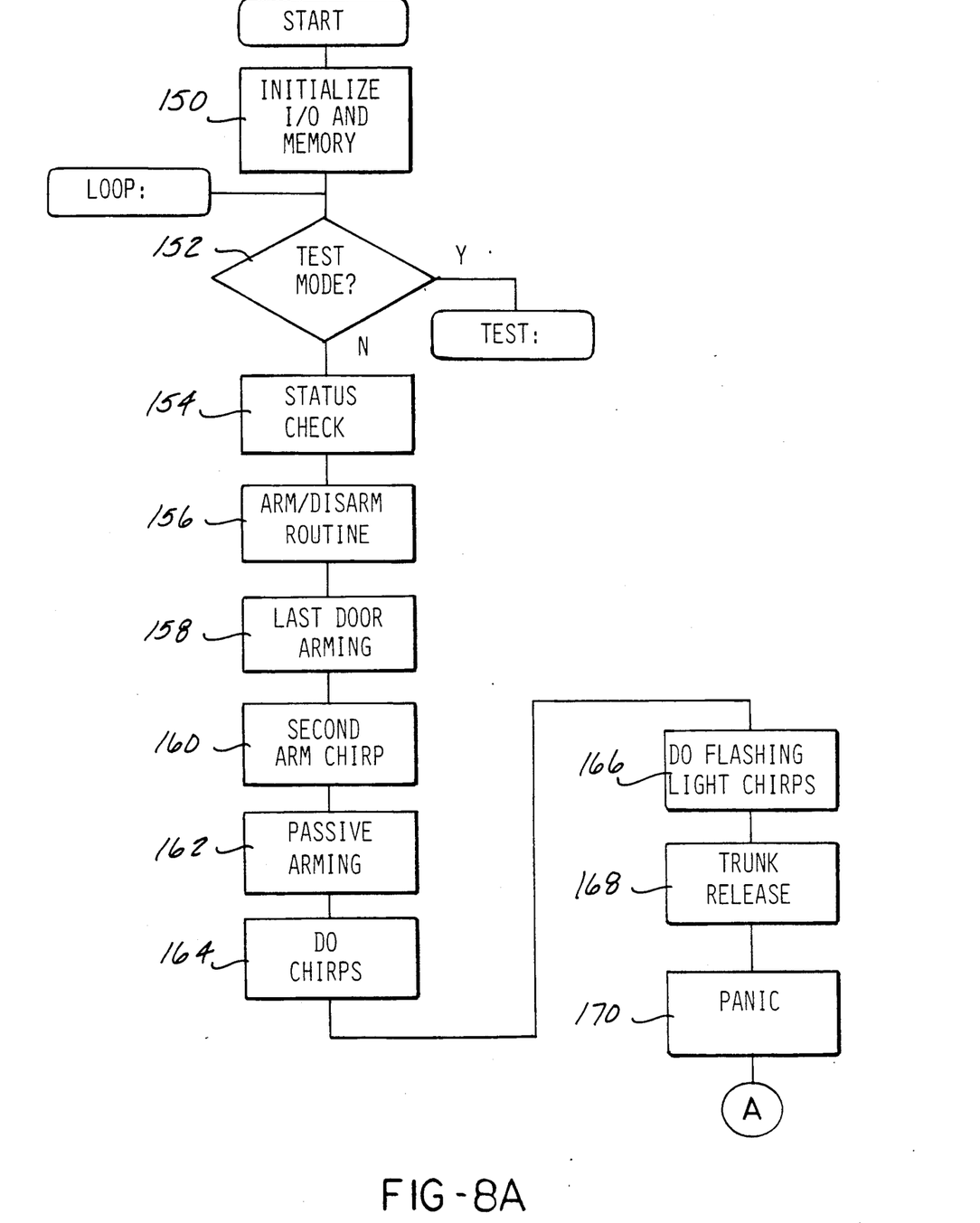
FIGS. 8A and 8B are flow diagrams showing the operation of the control program executed by the control means of the receiver shown in FIG. 6A.

As shown in FIG. 8A, upon initialization, the controller 70 initializes the I/O and the memory in step 150 and passes through a test mode in step 152 which is an internal diagnostic program used by the manufacturer in testing the internal operation of the receiver 60.

The controller 70 then executes a "status check" subroutine in step 154 which checks to make sure that the security apparatus is in one and only one mode. Valid modes are armed, disarmed, or prearmed. If the security apparatus is in more that one of these modes, or if no mode is set, then the security apparatus defaults or resets to the arm mode.

It will be understood that the various subroutines executed by the controller 70 are executed in a continuous loop with the controller 70 checking inputs and activating or deactivating outputs depending upon internal conditions specified by the control program. The controller 70 after the "status check" enters an arm/disarm routine in step 156. Upon receiving an input indicating that one or both of the push buttons 12 and 14 on the associated transmitter 10 or 48 has been depressed, the arm/disarm subroutine causes the security apparatus to arm if it was in a disarm mode or to disarm if it was in an arm mode. This subroutine also sets up the alarm 114 for "chirps" by placing a predetermined time or number in an internal timer specifying the duration of the "chirps", as described hereafter.

The last door arming subroutine 158 sets a one second internal timer between the first and second "chirps" and looks for closure of all of the vehicle doors before arming the alarm 114 for the second arm "chirp". This subroutine stops the second arm "chirp" until the time period has expired and all of the vehicle doors are closed. When this occurs, the second arm "chirp" subroutine 160 sets up the alarm 114 for generating the second "chirp".

The passive arming subroutine 162 if enabled by one of the loops 80, 82, 84, or 86 input to the microcontroller 70, sets an internal timer for approximately forty-five seconds in duration, to automatically enable arming of the security apparatus at the expiration of the preset time period, only if this feature is selected in the vehicle security apparatus.

The "do chirps" subroutine 164 controls the actual energization of the alarm 114 to generate a first "chirp" upon the receipt of a signal from the transmitter 10 or 48 requesting arming of the vehicle security apparatus and a second "chirp" when the security apparatus has been fully armed. The flashing light chirps subroutine 166 acts in conjunction with the chirps subroutine 164 and controls the activation of the vehicle exterior parking lights in conjunction with the activation of the alarm 114. The lights are activated once when the alarm mode is requested and twice when the security apparatus is fully armed.

The subroutines 156, 158, 160, 162, 164 and 166 are responsive to the arm and disarm of the security apparatus. The remaining subroutines are special features which may be selected in the vehicle security apparatus of the present invention. The trunk release subroutine 168 is responsive to the depression of the second push button 14 on the transmitter and releases the vehicle trunk latch when the vehicle security apparatus is disarmed. In a two car mode of operation, this subroutine is selected when the first push button 12 is depressed and held depressed for a predetermined amount of time, such as more than one second.

The panic subroutine 170 is responsive to the simultaneous depression of both push buttons 12 and 14 on the transmitter 10 or 48 and sets an internal panic timer of a predetermined time period, such as thirty seconds. This timer specifies the duration of energization of the visual alarm 116, which is the controlled flashing of the exterior parking lights of the vehicle. At the expiration of this time period, the alarm 116 is deactivated.

The hood lock subroutine 172 is similar to the trunk release subroutine 168 and is responsive to a disarm mode of the vehicle security apparatus. When disarmed, the hood lock subroutine 172 energizes an internal software timer which specifies a predetermined time period during which the hood lock output 122 connected to the hood lock of the vehicle is activated to release the hood lock. At the expiration of this time period, the hood lock output 122 is de-energized thereby locking the hood lock.

Figure 8B:
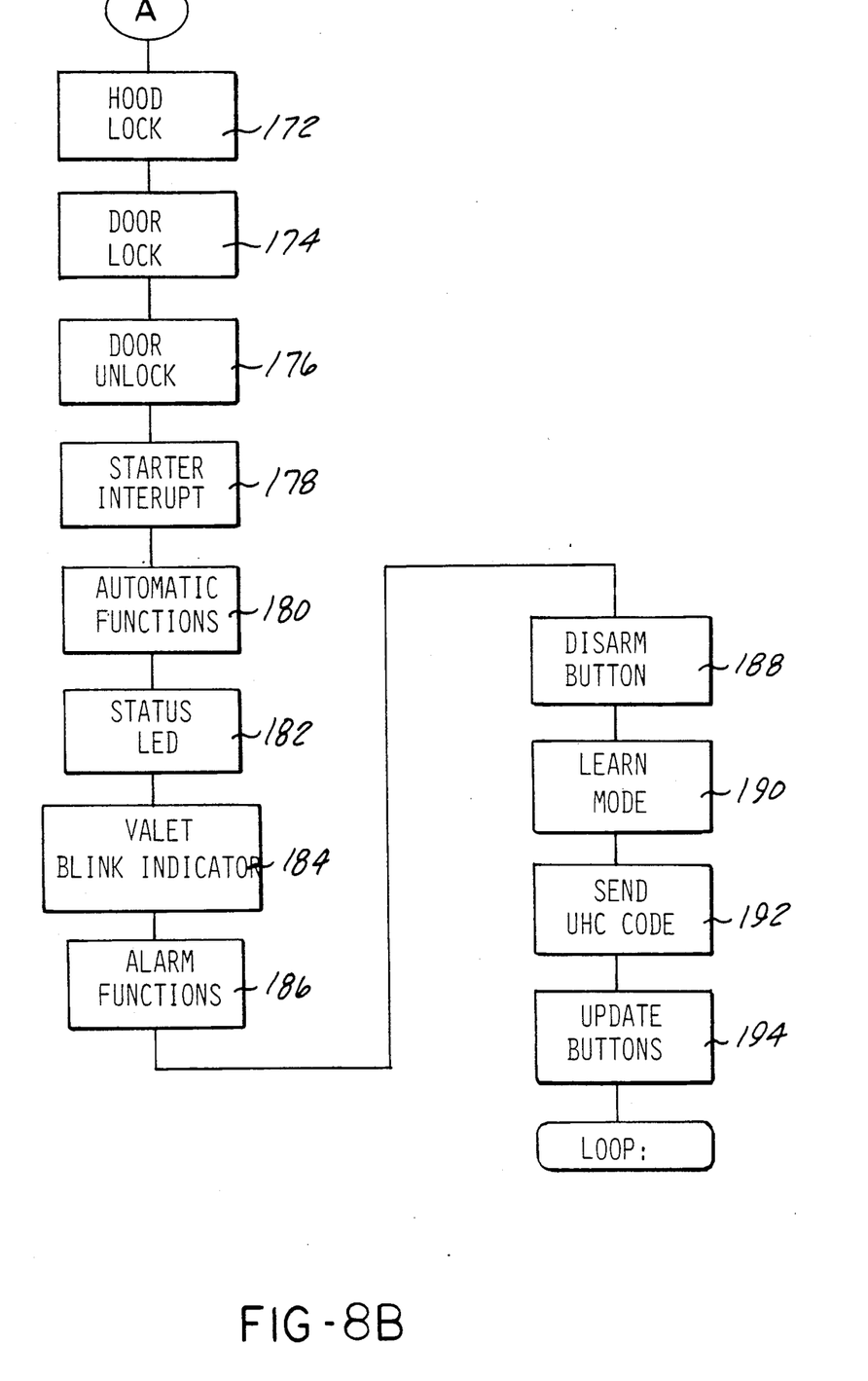

The door lock and door unlock subroutines 174 and 176, respectively, operate in substantially the same manner as the hood lock subroutine in controlling the automatic locking and unlocking of the vehicle doors. When the security apparatus is armed, the door lock subroutine 174 sets a predetermined time period at the expiration of which the door locks are automatically energized to lock the doors. The doors are automatically unlocked through subroutine 176 when the security apparatus is in a disarm mode.

The starter interrupt subroutine 178 looks at the status of the security apparatus and, when the security apparatus is armed, causes the relay 126 to energize interrupting the flow of current to the vehicle starter thereby inhibiting or preventing the operation of the vehicle. When disarmed, the relay 126 is de-energized enabling operation of the vehicle in a normal manner.

The automatic functions subroutine 180 is based on the on or off position of the ignition key switch and controls the door lock and unlock outputs as well as the hood lock and interior vehicle dome light which are coupled together. This subroutine 180 sets internal times which automatically lock or unlock the doors a predetermined time after the security system is armed or disarmed, unlocks the vehicle hood lock for a predetermined amount of time, such as fifteen seconds, after the security apparatus is disarmed before relocking the hood lock and simultaneously energizes the interior vehicle dome light for a predetermined amount of time, such as fifteen seconds, after the security apparatus is initally moved to the disarm mode.

The status LED subroutine 182 is responsive to the arming and disarming of the security apparatus and controls the energization of the LED 118 to indicate the arm or disarm status of the security apparatus. This output is time based to control the state of the LED 118.

The valet blink indicator subroutine 184 is responsive to the valet input push button 74 and sets an internal software timer for controlling the blinking of the status LED 118 to indicate that the security apparatus valet mode has been selected or is enabled.

The alarm function subroutine 186 actually controls the energization of the alarms 114 and 116. These alarm functions are set up during the arming and disarming of the security apparatus, as described above, but are not acted upon until the internal timer set by the alarm function subroutine 186 have expired. For example, if the security apparatus is in the arm mode and the vehicle door has been opened or an input received from the sensor, the alarm function subroutine 186 will energize the alarms 114 and 116 for a predetermined amount of time, such as sixty seconds. After expiration of the time period, the alarm function subroutine 186 resets the internal software timer and looks at the sensors for a subsequent attempted access to the vehicle.

The disarm button subroutine 188 is responsive to the disarm push button 78 and the state of the ignition key switch as indicated by input 76 to the microcontroller 70. If the ignition key is in the "on" position, depression of the disarm push button 78 will disarm the security apparatus as controlled by this subroutine.

In the learn mode, the receiver means 60 is receptive to learning and storing a code associated with a specific transmitter 10 or 48 so as to arm and disarm the antitheft means upon receiving successive coded signals from the transmitter. To place the receiver 60 in the "learn" mode, the door of the vehicle is opened and the ignition is turned "on". The operator then holds the disarm push button 78 depressed for a predetermined amount of time, such as fifteen seconds. At the completion of the fifteen second time period, the controller 70 activates the alarm 114 to "chirp" three times indicating that it is in the learn mode. The operator may then depress either of the first push button 12 on the transmitter 48 in a one car mode or either of the push buttons 12 and 14 in a two car mode to cause the programmed code stored in the transmitter 48 to be transmitted and stored in the memory 92 of the receiver means 60 under control of the controller 70. This process may be repeated by utilizing the other push button 12 or 14 on the transmitter 48 to enable the receiver 60 to learn a second code. The next time a code is to be programmed into the receiver 60, the stored code associated with the depressed push button on the transmitter will be deleted from memory storage and the next entered code stored in the memory 92 in its place.

The "send UHC code" subroutine 192 controls the underhood controller, described hereafter. It is responsive to changes in state of the starter, hood lock and sirens and, when a change in state is detected, sends out the appropriate code to the under hood controller to change the state of the starter interrupt, the hood lock or siren, as described in greater detail hereafter.

Finally, the "update buttons" subroutine 194 is at the end of the control loop and transfers a decoded manchester code received from the transmitter 10 or 48 to activate the various functions controlled by the microcontroller 70 as described above. This prevents overlapping or simultaneous activation of various features during each loop through the control program.

Figures 9A, 9B:
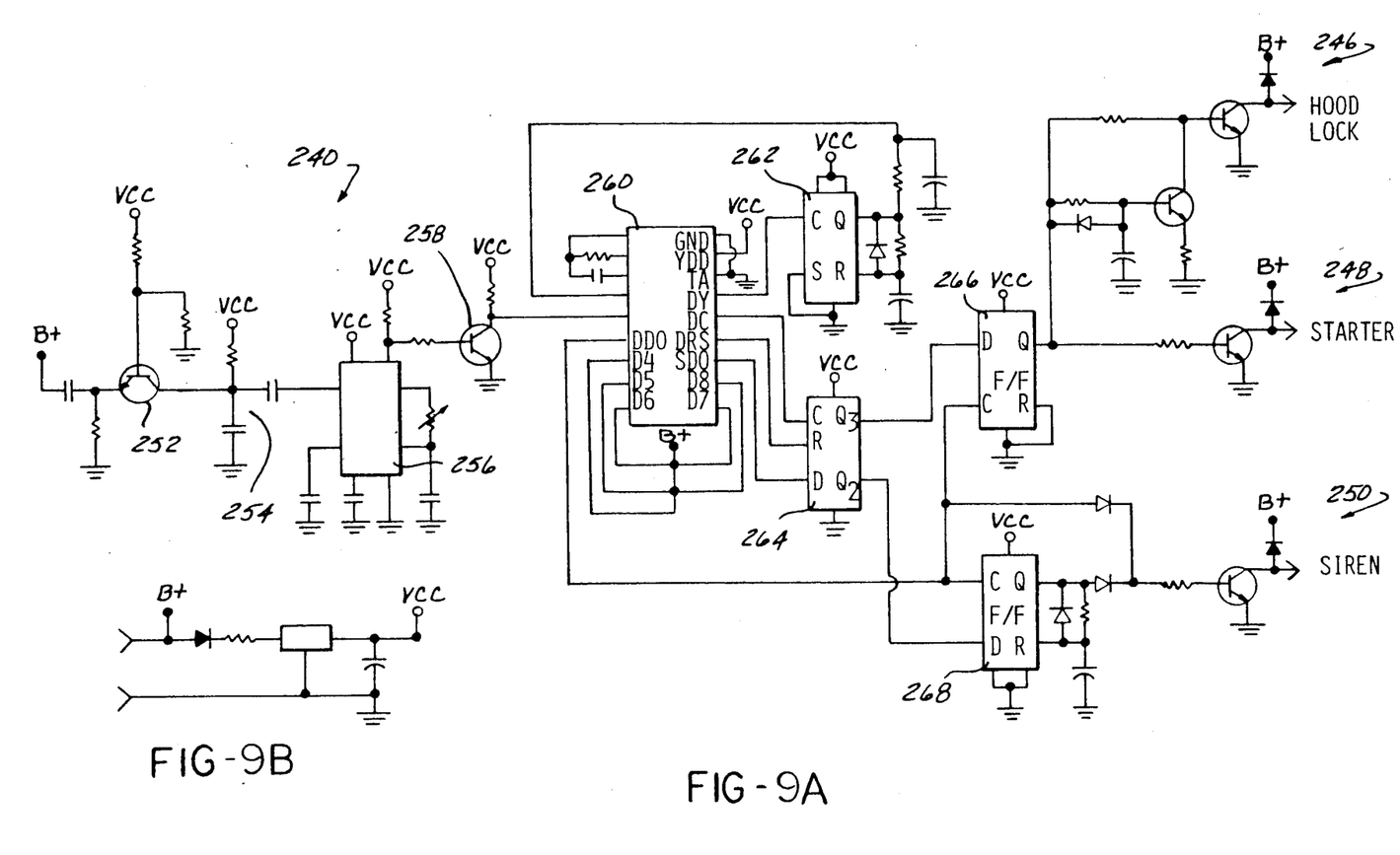
FIG. 9 is a schematic diagram of a remote, under hood control circuit which is employed in another embodiment of the vehicle security apparatus of the present invention.

As the receiver means 60 is typically mounted within the passenger compartment of the vehicle, wires are run through the vehicle fire wall to the audible alarm 114 which is typically mounted within the engine compartment. The engine starter is also located within the engine compartment along with the hood lock 122. To simplify the installation process, the vehicle security apparatus of the present invention may also include an under hood controller as shown in FIG. 9. The under hood controller 240 is mounted within the engine compartment of the vehicle and is connected to the vehicle electrical system conductors. The controller 70 in the receiver 60 communicates with the under hood controller 240 via the vehicle electrical conductors as described hereafter.

As shown in FIG. 6A, one output from the controller 70 is input to a transistor 242 which is connected between the vehicle electrical conductor voltage B+ and ground. Activation of the transistor 242 will temporarily place a ground on the vehicle electrical conductor which is detected by the under hood controller 240. The transistor 242 immediately turns off as the capacitor 243 charges to a predetermined voltage. A coded signal modulated at 50 Khz is transmitted over the vehicle power lines and includes a five bit address set by an under hood code selection means 244 input to the controller 70 as shown in FIG. 6A. The selection means wires 244 are cut or severed to form a binary address to identify the under hood controller 240. Additional bits specify the hood lock 246 and the starter interrupt 248, or the audible alarm or siren 250.

As shown in FIG. 9, the under hood controller 240 is connected to the B+ vehicle power conductors to receive the coded signal from the controller 70. Any fluctuation in the power line voltage, such as the momentary ground placed on the power lines by the momentary energization of the transistor 242, will be detected by a preamplifier 252 which amplifies the voltage fluctuations to a usable level. These signals are passed through a low pass filter 254 to a tone decode circuit 256. The tone decode circuit 256 is tuned to a frequency of 50 Khz. and demodulates the signal transmitted over the vehicle electrical power conductors. The output from the tone decode circuit 256 is passed through an inverter 258 as a binary coded signal to a decode circuit 260. The decode circuit 260 is preferably one sold by Supertex as model number ED-5. The decode circuit 260 decodes the incoming signal and generates outputs to activate and control the various security accessories located under the hood of the vehicle. A flip-flop 262 is connected to one of the outputs of the decode circuit 260 and provides a one second lockout between successive signal transmissions. A shift register 264 forms a one of two channel selector controlled by the decode circuit 260 and outputs the serial code. One output of the shift register 264 is input to a flip-flop 266 which activates both the hood lock 246 and the starter 248. The other output from the shift register 264 is input to a flip-flop 268 which controls the audible alarm or siren 250. The outputs 246, 248 and 250 are buffered by amplifiers to provide the desired voltage levels to activate the hood lock 246, the starter interrupt 248 and the audible alarm or siren 250.

In summary, there has been disclosed a unique vehicle security system which recognizes one of a large number of discrete coded signals from an associated transmitter to arm and disarm an anti-theft means mounted in a vehicle. The vehicle security system is also programmable so as to learn and store a code in a specific transmitter for subsequent recognition. Further, the vehicle security apparatus may be constructed to control various vehicle accessories to provide added security for the vehicle as well as enabling easy use of the security apparatus.

What is claimed is:

1. A vehicle security apparatus comprising:
   transmitter means carried by a user for transmitting a first discrete coded signal identifying a specific transmitter means;
   sensor means mounted on the vehicle for sensing attempted access to the vehicle;
   receiver means, mountable in the vehicle, for receiving and recognizing the first discrete coded signal from the transmitter means, the receiver means including;
   anti-theft means;
   means for learning a first discrete coded signal associated with a specific transmitter means while the first discrete coded signal is being transmitted by the transmitter means and received by the receiver means; and
   means for arming the anti-theft means upon the first receipt and recognition of a learned discrete coded signal and for disarming the anti-theft means upon the second receipt and recognition of the learned discrete coded signal.

2. The vehicle security apparatus of claim 1 wherein the transmitter means includes:
   means for storing a discrete code.

3. The vehicle security apparatus of claim 2 wherein the storing means comprises:
   a plurality of selectively severable electrical conductors connected in parallel to a source of electrical power and forming a discrete binary code when electrical power is applied thereto.

4. The vehicle security apparatus of claim 2 wherein the storing means comprises:
   controller means for receiving a code from the transmitter means; and
   memory means, responsive to the controller means, for storing the discrete code.

5. The vehicle security apparatus of claim 1 wherein the transmitter means further includes:
   a first push button for activating the transmitter means to transmit a first discrete coded signal.

6. The vehicle security apparatus of claim 2 wherein the transmitter means further includes:
   means for storing a plurality of discrete codes;
   a plurality of push buttons, each associated with one of the plurality of stored discrete codes; and
   controller means, responsive to the push buttons, for transmitting the stored discrete code associated with the depressed push button.

7. The vehicle security apparatus of claim 6 wherein the learning means further includes:
   means for learning a plurality of discrete coded signals while each discrete coded signal is being transmitted by any transmitter means and received by the receiver means; and
   means, responsive to the successive receipt and recognition of each discrete coded signal, for arming and disarming the anti-theft means.

8. The vehicle security apparatus of claim 1 wherein the anti-theft means comprises:
   means for inhibiting the starting of the vehicle when armed.

9. The vehicle security apparatus of claim 8 wherein the means for inhibiting starting of the vehicle comprises:
   switch means, responsive to the receiver means and connected between the vehicle battery and the vehicle starter, for disconnecting electrical power to the starter of the vehicle when the anti-theft means is armed.

10. The vehicle security apparatus of claim 1 wherein the anti-theft means comprises:
    alarm means, responsive to the receiver means and the sensor means, for generating an alarm when an attempted access to the vehicle is sensed by the sensor means while the anti-theft means is armed.

11. The vehicle security apparatus of claim 10 wherein the alarm means is an audible alarm mounted on the vehicle.

12. The vehicle security apparatus of claim 10 wherein the alarm means is a visual alarm mounted on the vehicle.

13. The vehicle security apparatus of claim 12 wherein the visual alarm is a light.

14. The vehicle security apparatus of claim 10 wherein the alarm means comprises audible and visual alarms.

15. The vehicle security apparatus of claim 1 wherein the anti-theft means comprises:
    means for inhibiting starting of the vehicle when armed; and
    alarm means, responsive to the receiver means, for generating an alarm when an attempted access to the vehicle is sensed by the sensor means and the anti-theft means is armed.

16. The vehicle security apparatus of claim 15 wherein the alarm means comprises audible and visual alarms.

* * * * *